US008535792B2

(12) United States Patent
Lowery et al.

(10) Patent No.: US 8,535,792 B2
(45) Date of Patent: Sep. 17, 2013

(54) POLYETHERIMIDE RESINS WITH VERY LOW LEVELS OF RESIDUAL CONTAMINATION

(75) Inventors: Daniel Francis Lowery, Mount Vernon, IN (US); Jamuna Chakravarti, Evansville, IN (US); Aaron Royer, Evansville, IN (US)

(73) Assignee: Sabic Innovative Plastics IP B.V., Bergen op Zoom (NL)

( * ) Notice: Subject to any disclaimer, the term of this patent is extended or adjusted under 35 U.S.C. 154(b) by 102 days.

(21) Appl. No.: 13/174,433

(22) Filed: Jun. 30, 2011

(65) Prior Publication Data

US 2013/0003227 A1 Jan. 3, 2013

(51) Int. Cl.
*B32B 3/02* (2006.01)
*C08L 79/08* (2006.01)
*C08K 7/14* (2006.01)
*G11B 5/48* (2006.01)

(52) U.S. Cl.
USPC ....... 428/220; 428/64.1; 360/245.8; 360/133; 528/208; 524/600; 264/210.8; 361/679.31

(58) Field of Classification Search
None
See application file for complete search history.

(56) References Cited

U.S. PATENT DOCUMENTS

| 6,919,422 | B2 * | 7/2005 | Gallucci et al. | 528/353 |
|---|---|---|---|---|
| 7,674,920 | B2 * | 3/2010 | Bernabe et al. | 549/241 |
| 7,999,024 | B2 * | 8/2011 | Hall | 524/378 |
| 8,357,773 | B1 * | 1/2013 | Gallucci et al. | 528/480 |
| 2004/0260055 | A1 | 12/2004 | Gallucci et al. | |
| 2005/0080228 | A1 | 4/2005 | Silvi et al. | |
| 2007/0073035 | A1 * | 3/2007 | Stella et al. | 528/350 |
| 2010/0304298 | A1 | 12/2010 | Hirashima et al. | |

FOREIGN PATENT DOCUMENTS

JP 11-54862 2/1999

OTHER PUBLICATIONS

International Search Report dated Sep. 13, 2012.
Written Opinion of the International Searching Authority dated Sep. 13, 2012.

* cited by examiner

*Primary Examiner* — Kevin Bernatz
(74) *Attorney, Agent, or Firm* — Novak Druce Connolly Bove + Quigg LLP; Diderico van Eyl

(57) ABSTRACT

Compositions and methods for producing compositions comprising a monoamine-endcapped polyimide component. Based on a gas chromatography mass spectroscopy analysis of a surface rinse of the composition performed at room temperature, the composition can have at least one surface with less than or equal to 5 ppb releasable phosphorous residuals, and less than or equal to 5 ppb releasable volatile organic compound residuals. The composition can also comprise less than or equal to 10 ppb combined releasable residuals. Because of the very low levels of residual contamination, the compositions can be used to produce a variety of articles, including a disk drive.

15 Claims, No Drawings

POLYETHERIMIDE RESINS WITH VERY LOW LEVELS OF RESIDUAL CONTAMINATION

BACKGROUND OF THE INVENTION

1. Field of the Invention

The invention relates generally to polymer compositions with very low levels of residual contamination, and more specifically to compositions comprising a monoamine-endcapped polyimide component with very low levels of residual contamination.

2. Description of the Related Art

Polyetherimides are a class of polymers that display excellent high temperature performance and can be processed to make molded articles, fibers, films, foams etc. For example, polyimide resins such as ULTEM® resin grades 1000 or 1010 with a melt viscosity (MI) range of 0.8-1.1 and 1.6-2.0, respectively, find wide use in applications where high temperature performance and easy processability is required. However, these resins do not meet stringent cleanliness requirements that are dictated by newer, high end applications. High end applications of polyetherimides, such as in semiconductors or fibers, require the resin to have very low contamination levels, or the processability and/or product performance is adversely affected.

Common resin contaminants could be organic or inorganic in nature. The organic contaminants are mostly lower molecular weight species. One such low molecular weight species is phthalic anhydride m-phenylene diamine imide (PAMI), formed by the reaction of two moles of phthalic anhydride which is used as an end cap in the polymer reaction, and one mole of m-phenylene diamine (mPD), which is one of the monomers. This molecule has been found to 'plate out' on equipment parts during the molding operation. U.S. Pat. No. 6,919,422 B2, which is hereby incorporated by reference in its entirety, provides details of a polyimide composition that solves the above plate out issue by replacing the PAMI end cap with a monoamine end cap, such as aniline. Thus, in the place of PAMI, a larger molecule is formed on the reaction of 2 moles of aniline with one mole of the dianhydride monomer. This molecule does not plate out to the extent that PAMI does. A common inorganic contaminant is stabilizer Irgafos 168 and its oxidized version. The stabilizer is added to the polymer prior to extrusion to lower color of the final resin. There is residual stabilizer in measurable quantity in the resin pellets post extrusion. The residual stabilizer is linked to higher particle counts in the resin.

BRIEF SUMMARY OF THE INVENTION

A first embodiment relates to a composition comprising a monoamine-endcapped polyimide component. The monoamine-endcapped component can be selected from the group consisting of monoamine-endcapped polyetherimides, monoamine-endcapped polyetherimide sulfones, and combinations thereof. Based on a gas chromatography mass spectroscopy analysis of a surface rinse of the composition performed at room temperature, the composition can have at least one surface with less than or equal to 5 ppb releasable phosphorous residuals, and less than or equal to 5 ppb releasable volatile organic compound residuals. The composition can also comprise less than or equal to 10 ppb combined releasable residuals.

A second embodiment relates to a process of melt-spinning fibers, the process comprising melting the composition of the first embodiment to form a melt, passing the melt through a spinnerette to form fibers, and stretching the fibers.

A third embodiment relates to a composition comprising: (a) from 60 to 99 weight percent of a polyimide component selected from the group consisting of polyetherimides, polyetherimide sulfones, and combinations thereof, wherein the composition contains <5 ppb releasable phosphorous residuals, wherein the polyimide component is monoamine-endcapped; and (b) from 1 to 40 weight percent of a filler.

A fourth embodiment relates to a disk drive comprising: a disk; and an article enclosing at least one surface of the disk. The article can comprise a polyimide component selected from the group consisting of polyetherimides, polyetherimide sulfones, and combinations thereof. The composition can contain <5 ppb releasable phosphorous residuals. The polyimide component can be monoamine-endcapped.

A fifth embodiment relates to a disk drive comprising: a disk, a disk enclosure enclosing at least one surface of the disk, and a head actuated over the disk. The disk enclosure can comprise a polyimide component selected from the group consisting of polyetherimides, polyetherimide sulfones, and combinations thereof. The polyimide component can contain <5 ppb releasable phosphorous residuals. The polyimide component can be monoamine-endcapped. The head actuated over the disk can comprise a read element, a write element, a preamp, and an interconnect. The interconnect can comprise a first transmission line, a second transmission line coupling the head to the preamp, and a compensation network operable to compensate for an impedance discontinuity in the first and second transmission lines. The compensation network can comprise a first trace, and a second trace connected in parallel with the first and second transmission lines. A shape of the first and second traces can vary to form at least a first capacitor.

A sixth embodiment relates to a method for producing a polyimide component selected from the group consisting of polyetherimides, polyetherimide sulfones, and combinations thereof. The polyimide component can contain <5 ppb releasable phosphorous residuals. The composition can comprise <10 ppb combined releasable contaminants. The method can comprise monoamine-endcapping the polyimide component.

DETAILED DESCRIPTION OF THE INVENTION

The invention is based on the remarkable discovery that it is now possible to make articles from polyetherimides and polyetherimide sulfones that have low amounts of releasable phosphorous residuals and low amounts releasable volatile organic compound residuals. Advantageously, the relatively low amount of releasable phosphorous residuals and releasable volatile organic compound makes our compositions and articles suitable for many electronic applications requiring polymers that are clean-such as hard disk drive applications.

The present invention may be understood more readily by reference to the following detailed description of preferred embodiments of the invention as well as to the examples included therein.

All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant FIGURE.

The present invention relates to polymer resins with very low levels of residual contamination. These polymers are suitable for applications that have extremely stringent cleanliness requirements. These resins can be articles of, but not limited to, data storage disk drives, fibers, membranes, parts used in the semi-conductor industry etc. to name a few applications.

The term "clean room ready," as used in this application, means that our composition (or an article made with our composition) has at least one surface that releases less than or equal to 5 ppb phosphorous residuals, less than or equal to 5 ppb volatile organic compound residuals, such that the composition as a whole contained less than or equal to 10 ppb released residuals when the surface is exposed to conditions of use, e.g. based on a gas chromatography mass spectroscopy analysis of a surface rinse of the composition performed at room temperature.

Various embodiments relate to a monoamine-endcapped polyimide component. The polyimide can be selected from polyetherimides, siloxane-polyetherimides, polyetherimide sulfones, and combinations thereof. The polyetherimides are of formula (1):

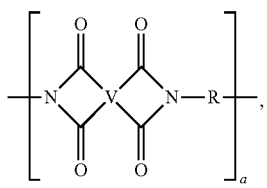

(1)

wherein a is more than 1, for example 10 to 1,000 or more, or more preferably 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

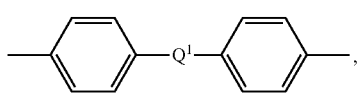

(2)

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3):

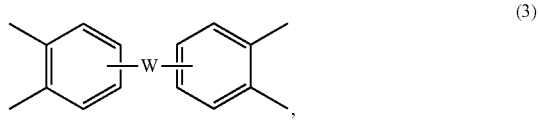

(3)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

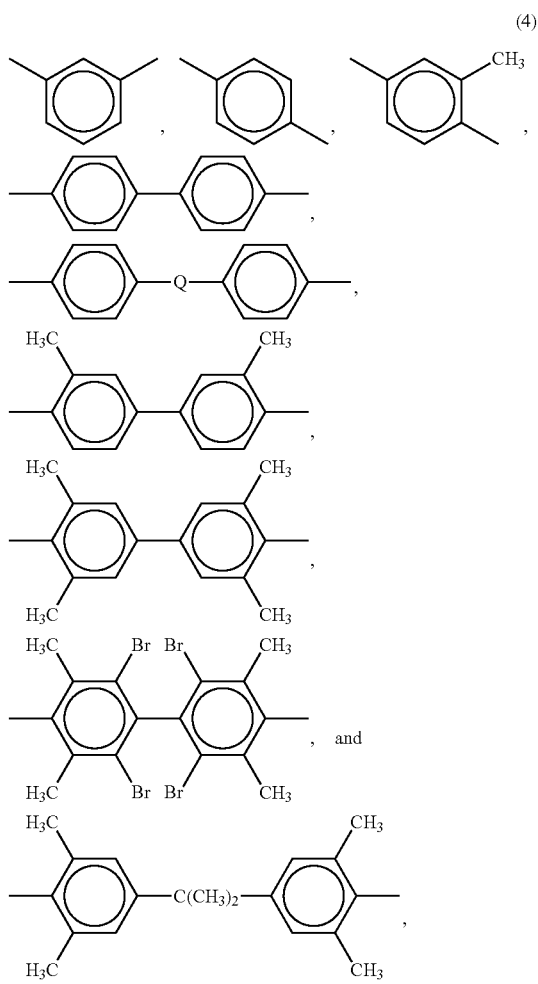

(4)

wherein Q includes, but is not limited to a divalent moiety including —O—, —S—, —C(O)—, —SO$_2$—, —SO—, —C$_y$H$_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

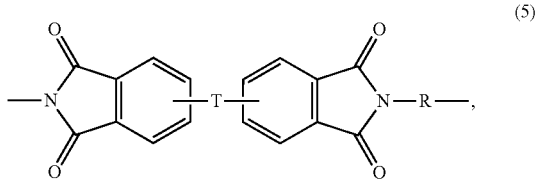

(5)

wherein T is —O— or a group of the formula —O—Z—O— wherein the divalent bonds of the —O— or the —O—Z—O— group are in the 3,3', 3,4', 4,3', or the 4,4' positions; Z is a divalent group of formula (3) as defined above; and R is a divalent group of formula (2) as defined above.

In another specific embodiment, the polyetherimide sulfones are polyimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6):

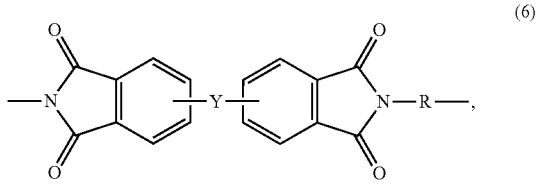

(6)

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO$_2$— groups.

It is to be understood that the polyetherimides and polyetherimide sulfones can optionally comprise linkers V that do not contain ether or ether and sulfone groups, for example linkers of formula (7):

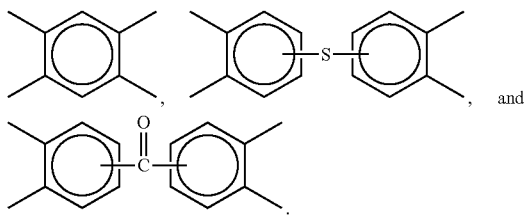

(7)

Imide units containing such linkers are generally present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of a bis(phthalimide) for formula (8):

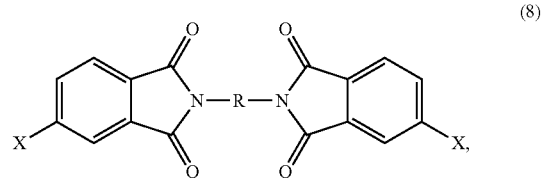

(8)

wherein R is as described above and X is a nitro group or a halogen. Bisphthalimides (8) can be formed, for example, by the condensation of the corresponding anhydride of formula (9):

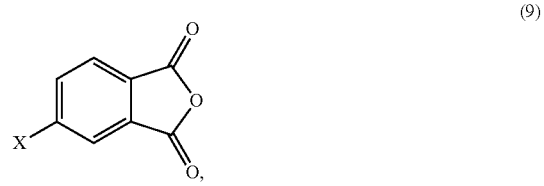

(9)

wherein X is a nitro group or halogen, with an organic diamine of the formula (10):

H$_2$N—R—NH$_2$ (10), wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(b-amino-t-butyl) toluene, bis (p-b-amino-t-butylphenyl)ether, bis(p-b-methyl-o-aminophenyl) benzene, bis(p-b-methyl-o-aminopentyl) benzene, 1,3-diamino-4-isopropylbenzene, bis(4-aminophenyl)ether and 1,3-bis(3-aminopropyl) tetramethyldisiloxane. Mixtures of these amines can be used.

Illustrative examples of amine compounds of formula (10) containing sulfone groups include but are not limited to, diamino diphenyl sulfone (DDS) and bis(aminophenoxy phenyl) sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon is a bisphenol, such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination. In one embodiment, only the polyetherimide is used. In another embodiment, the weight ratio of polyetherimide:polyetherimide sulfone can be from 99:1 to 50:50.

The polyimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute average molecular weight (Mw).

The polyimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyimides can have a glass transition temperature of greater than 180° C., specifically of 200° C. to 500° C., as measured using differential scanning calorimetry (DSC) per ASTM test D3418. In some embodiments the polyimide, and in particular a polyetherimide, has a glass transition temperature of 240 to 350° C.

The polyimides can have a melt index of 0.1 to 10 grams per minute (g/min), as measured by American Society for Testing Materials (ASTM) DI 238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methylphthalimide is nitrated with 99% nitric acid to yield a mixture of N-methyl-4-nitrophthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and NaNO$_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chlorophthalic anhydride and meta-phenylene diamine are reacted in the presence of a catalytic amount of sodium phenyl phosphinate catalyst to produce the bischlorophthalimide of meta-phenylene diamine (CAS No. 148935-94-8). The bischlorophthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischlorophthalimides which may be polymerized by chloro-displacement with BPA disodium salt as described above.

Siloxane polyetherimides can include polysiloxane/polyimide block copolymers having a siloxane content of greater than 0 and less than 40 weight percent (wt %) based on the total weight of the block copolymer. The block copolymer comprises a siloxane block of Formula (I):

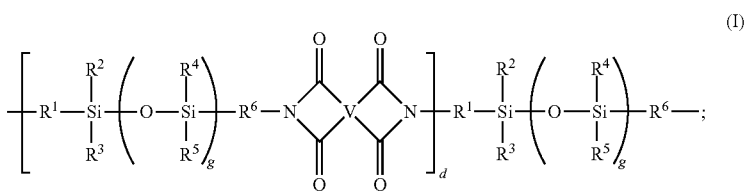

(I)

wherein R$^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics B.V.)

A first embodiment relates to a composition comprising a monoamine-endcapped polyimide component. The monoamine-endcapped polyimide component can be aniline-endcapped. The monoamine-endcapped component can be selected from the group consisting of monoamine-endcapped polyetherimides, monoamine-endcapped polyetherimide sulfones, and combinations thereof.

Based on a gas chromatography mass spectroscopy analysis of a surface rinse of the composition performed at room temperature, the composition can have at least one surface with an amount of releasable phosphorous residuals within a range having a lower limit and/or an upper limit. The range can include or exclude the lower limit and/or the upper limit. The lower limit and/or upper limit can be selected from 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 ppb. For example, at least one surface of the composition can have ≦5 ppb releasable phosphorous residuals, <3 ppb phosphorous, or <1 ppb phosphorous.

Based on a gas chromatography mass spectroscopy analysis of a surface rinse of the composition performed at room temperature, the composition can have at least one surface with an amount of releasable volatile organic compound residuals within a range having a lower limit and/or an upper limit. The range can include or exclude the lower limit and/or the upper limit. The lower limit and/or upper limit can be selected from 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 ppb. For example, at least one surface of the composition can have ≦5 ppb releasable volatile organic compound residuals.

The composition can have an amount of combined releasable residuals within a range having a lower limit and/or an upper limit. The range can include or exclude the lower limit and/or the upper limit. The lower limit and/or upper limit can be selected from 0, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, and 20 ppb. For example, the composition can also comprise ≦10 ppb combined releasable residuals.

The composition according to the first embodiment can further comprise a filler selected from the group of organic fillers, inorganic fillers, and combinations thereof. The composition according to the first embodiment can further comprise a filler selected from the group of carbon fibers, glass fibers, minerals, and combinations thereof.

The composition according to the first embodiment can further comprise one or more stabilizers in an amount within a range having a lower limit and/or an upper limit. The range can include or exclude the lower limit and/or the upper limit. The lower limit and/or upper limit can be selected from 0, 0.001, 0.002, 0.003, 0.004, 0.005, 0.01, 0.015, 0.02, 0.025, 0.03, 0.035, 0.04, 0.045, 0.05, 0.1, 0.15, 0.2, 0.25, 0.3, 0.35, 0.4, 0.45, 0.5, 1, 1.5, 2, 2.5, 3, 3.5, 4, 4.5, and 5 weight percent based on the total weight of the composition. For example, the composition can contain <2 weight percent stabilizers, <1 weight percent stabilizers, <0.001 weight percent stabilizers, or no stabilizers.

The composition according to the first embodiment can be employed in an article. The article can be circular and can have a diameter within a range having a lower limit and/or an upper limit. The range can include or exclude the lower limit and/or the upper limit. The lower limit and/or upper limit can be selected from 1, 1.5, 2, 2.5, 3, 3.5, 4, 4.5, 5, 5.5, 6, 6.5, 7, 7.5, 8, 8.5, 9, 9.5, and 10 cm. For example, the article can be circular and can have a diameter ranging from 2 cm to 5 cm. The article can have a thickness within a range having a lower limit and/or an upper limit. The range can include or exclude the lower limit and/or the upper limit. The lower limit and/or upper limit can be selected from 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.5, 3, 3.5, 4, 4.5, 5, 5.5, 6, 6.5, 7, 7.5, 8, 8.5, 9, 9.5, and 10 mm. For example, the article can have a thickness ranging from 0.5 mm to 2 mm.

Based on a gas chromatography mass spectroscopy analysis of vapors released at 350 degrees Celsius, for 15 minutes, the composition according to the first embodiment can have at least one surface can have an amount of combined releasable inorganic volatile compounds and organic volatile compounds within a range having a lower limit and/or an upper limit. The range can include or exclude the lower limit and/or the upper limit. The lower limit and/or upper limit can be selected from 1000, 1500, 2000, 2500, 3000, 3500, 4000, 4500, 5000, 5500, 6000, 6500, 7000, 7500, 8000, 8500, 9000, 9500, 10000, 10500, 11000, 11500, 12000, 12500, 13000, 13500, 14000, 14500, 15000, 15500, 16000, 16500, 17000, 17500, 18000, 18500, 19000, 19500, and 20000 ppb. For example, based on a gas chromatography mass spectroscopy analysis of vapors released at 350 degrees Celsius, for 15 minutes, the composition according to the first embodiment can have at least one surface can have less than or equal to 20,000 ppb combined releasable inorganic volatile compounds and organic volatile compounds.

A second embodiment relates to a process of melt-spinning fibers, the process comprising melting the composition of claim 1 to form a melt, passing the melt through a spinnerette to form fibers, and stretching the fibers. The fibers can exhibit reduced strand breakage.

A third embodiment relates to a composition comprising: (a) from 60 to 99 weight percent of a polyimide component selected from the group consisting of polyetherimides, polyetherimide sulfones, and combinations thereof, wherein the composition contains <5 ppb releasable phosphorous residuals, wherein the polyimide component monoamine-endcapped; and (b) from 1 to 40 weight percent of a filler. The polyimide component can be aniline-endcapped. The filler can be selected from the group of organic fillers, inorganic fillers, and combinations thereof. The filler can be selected from the group of carbon fibers, fiber glass, minerals, and combinations thereof.

A fourth embodiment relates to a disk drive comprising: a disk; and an article enclosing at least one surface of the disk. The article can comprise a polyimide component selected from the group consisting of polyetherimides, polyetherimide sulfones, and combinations thereof. The composition can contain <5 ppb releasable phosphorous residuals. The polyimide component can be monoamine-endcapped. The polyimide component can be aniline-endcapped.

A fifth embodiment relates to a disk drive comprising: a disk, a disk enclosure enclosing at least one surface of the disk, and a head actuated over the disk. The disk enclosure can comprise a polyimide component selected from the group consisting of polyetherimides, polyetherimide sulfones, and combinations thereof. The polyimide component can contain <5 ppb releasable phosphorous residuals. The polyimide component can be monoamine-endcapped. The head actuated over the disk can comprise a read element, a write element, a preamp, and an interconnect. The interconnect can comprise a first transmission line, a second transmission line coupling the head to the preamp, and a compensation network operable to compensate for an impedance discontinuity in the first and second transmission lines. The compensation network can comprise a first trace, and a second trace connected in parallel with the first and second transmission lines. A shape of the first and second traces can vary to form at least a first capacitor.

A sixth embodiment relates to a method for producing a polyimide component selected from the group consisting of polyetherimides, polyetherimide sulfones, and combinations thereof. The polyimide component can contain <5 ppb releasable phosphorous residuals. The composition can comprise <10 ppb releasable contaminants. The method can comprise monoamine-endcapping the polyimide component. The monoamine-endcapping can be performed in the absence of phosphorous and volatile organic compounds.

EXAMPLES

Four resin grades were tested side by side to compare contaminant levels. The resin grades used for the comparison study were 1010 standard (PA end cap, with stabilizer), 1010 K (aniline end cap, with stabilizer), 1010 NS (PA end cap, no stabilizer), and 1010K NS (aniline end cap, no stabilizer). The first test involved extracting the surface contaminants from the resin using three common solvents-methanol, acetonitrile and hexane. The contaminants were identified and their levels determined using GC-MS. The same process of solvent extraction and analysis was done after baking the resin at 85 degrees Celsius and 350 degrees Celsius in an oven for 15 minutes. The second test involved GC-MS of volatiles outgassed from resin at 350 degrees Celcius.

Table 1 summarizes materials used in the Examples.

TABLE 1

| Material | Description | Source |
|---|---|---|
| PEI 1 | Ultem ® 1010 Resin | SABIC Innovative Plastics |
| PEI 2 | Ultem ® 1010 K Resin | SABIC Innovative Plastics |
| PEI 3 | Stabilizer-Free Phthalic anhydride endcapped-Polyetherimide Resin | SABIC Innovative Plastics |
| PEI 4 | Aniline-end-capped Stabilizer Free Polyetherimide Resin | SABIC Innovative Plastics |

PEI 3 Preparation Process

The experimental material, labeled as PEI 3 above, was made according to the following procedure. Synthesis of standard PEI with no phosphite or hindered phenol stabilizer added. Into a reaction vessel was charged 552.7 kg 2,2-bis[4-(3,4-dicarboxyphenoxy)phenyl]propane dianhydride hereinafter referred to as bisphenol-A dianhydride or "BPADA" (approximate composition, 97.6 mole % BPADA, 2.4 mole % mono N-methyl imide of BPADA), 8.12 kg of phthalic anhydride (PA) and 1155 liters of o-dichlorobenzene (ODCB). The reaction mixture was heated to 150-160° C. Molten m-phenylene diamine (MPD) (116.3 kg) at 140-150° C. was added over the course of 30 minutes. After the MPD addition was complete, the reaction mixture was heated to 180° C. with removal of water. Once the imidization was essentially complete and no further water was evolved, the reaction mixture was moved to a hold tank kept at 170° C. and then fed into a solvent removal system. Solvent was removed using a wiped film evaporator reducing ODCB down to less than 500 ppm. The molten polymer was extruded into strands, cooled in a water bath and chopped to give finished pellets. The resultant polymer had a Mw of about 31,200 g/mole.

PEI 4 Preparation Process

The experimental material, labeled as PEI 4 above, was made according to the following procedure. Synthesis of aniline end-capped PEI with no phosphite or hindered phenol stabilizer added. Into a reaction vessel was charged 567 kg BPADA (approximate composition, 97.6 mole % BPADA, 2.4 mole % mono N-methyl imide of BPADA) and 1155 liters of o-dichlorobenzene (ODCB). The reaction mixture was heated to 150-160° C. Molten MPD (113.4 kg) at 140-150° C. was added over the course of 30 minutes. Simultaneously, 5.1 kg aniline was added. Both the aniline and MPD were pumped through a static mixer while being added to the BPADA. After the MPD addition was complete, the reaction mixture was heated to 180° C. with removal of water. The reaction mixture was moved to a hold tank kept at 170° C. and then fed into a solvent removal system. Solvent was removed using a wiped film evaporator reducing ODCB down to less than 500 ppm. The molten polymer was extruded into strands, cooled in a water bath and chopped to give finished pellets. The resultant polymer had a Mw of about 31,200 g/mole.

Analytical Testing Procedure for Determining Clean Room Readiness

The analytical testing procedure for determining whether compositions were clean room ready is described below. For the purposes of "Clean room ready" meant that our composition (or an article made with our composition) had at least one surface that releases less than or equal to 5 ppb phosphorous residuals, less than or equal to 5 ppb volatile organic compound residuals, such that the composition as a whole released less than or equal to 10 ppb residuals.

Four resin grades (PEI 1, PEI 2, PEI 3, and PEI 4) were tested side by side to compare contaminant levels. The resin grades used for the comparison study were PEI (phthalic anhydride end capped polyetherimide resin, with stabilizer), PEI 2 (aniline end cap, with stabilizer) and PEI 3 (phthalic anhydride end cap, with no stabilizer), PEI 4 (aniline end cap, no stabilizer).

The first test involved extracting the surface contaminants from the resin using acetonitrile. The contaminants were identified and their levels determined using GC-MS. The second test consisted of thermal desorption after baking the resin at 350° C. in an oven for 15 minutes.

Gas Chromatography-Mass Spectroscopy (GC-MS) Analysis of Surface Rinse of Composition:

GC-MS analysis was performed on an Agilent 5975 GC-MS instrument. A TR-5MS column (30M×0.25 mm ID×0.25μ film thickness) was used to separate the analytes of interest. A 3 μl injection was performed using an automatic liquid sampler. The injection port was held at 300° C. and a splitless injection was performed with a purge flow of 1.0 ml/min. The oven was initially held at 35° C. for 1 min and then ramped at 15° C./min to 300° C. and held for 31.33 min. The mass spectrometer was operated in scan mode (33-700 amu). The results are summarized in Table 2.

TABLE 2

| Elution Time | Identification | Peak Area | ng/g |
|---|---|---|---|
| 13.99 | internal standard (D-10 anthracene, further described in Example 1) | 7922513 | N/A |
| 17.24 | 9-octadecenamide | 1305986 | 8.2 |
| 19.44 | 13-docosenamide | 345387 | 2.2 |

N/A: Not Applicable

Example 1 (Inventive)

The GC-MS analysis procedure above was practiced. More particularly, a 5 gram sample of PEI 4 was poured directly into a 40 ml scintillation vial. A 10 ml aliquot of acetonitrile (HRGC grade) was added to the vial by pipette. The vial was then capped and placed on a mechanical shaker for 5 min. The wash solution was then separated from the pellets by pouring into a new, 40 ml scintillation vial. The scintillation vial was then placed under a nitrogen purge to evaporate the solvent to dryness. A 0.3 ml aliquot of acetonitrile was added to the wash residue and shaken for 15 min to redissolve the residue. The solution was then transferred to a low volume reservoir vial and evaporated to dryness under the nitrogen purge. A 50 ul solution of 2 ppm D-10 anthracene was then added to the low-volume reservoir vial and analyzed by GC-MS. N.D. is for "not detected."

The results of Example 1 are summarized in Table 3. PEI 4 was found to be the cleanest per the test protocol above and is expected to perform better during processing and final part performance.

TABLE 3

| Elution Time | Identification | Peak Area | ng/g |
|---|---|---|---|
| 13.99 | internal standard | 6151522 | |
| 16.17 | Hexadecanamide | 201395 | 1.6 |
| 17.24 | 9-octadecenamide | 303938 | 2.4 |
| 17.36 | Octadecanamide | 0 | N.D. |
| 18.1 | di-octyl phthalate | 0 | N.D. |
| 19.44 | 13-docosenamide | 0 | N.D. |
| 28.23 | Hindered Phosphite | 0 | N.D. |
| 33.49 | C20-C40 Organic Molecule | 0 | N.D. |

The results of Example 1 show that our composition had at least one surface releasing < or =5 ppb releasable phosphorous residuals, < or =5 ppb releasable volatile organic compound residuals, and wherein the composition released < or = 10 ppb releasable residuals was clean room ready.

More particularly, our results show that articles molded from the resin material used above (a stabilizer-free aniline-capped polyetherimide) released detectable combined amount of 4.0 ppb, substantially below the amount of residuals obtained with comparative examples as further described below.

Example 2 (Comparative)

A GC-MS analysis with acetonitrile (ACN) rinse of PEI 1 (Ultem® 1010 Resin) was practiced. A 5 gram sample of PEI 1 was poured directly into a 40 ml scintillation vial. A 10 ml aliquot of acetonitrile (HRGC grade) was added to the vial by pipette. The vial was then capped and placed on a mechanical shaker for 5 min. The wash solution was then separated from the pellets by pouring into a new, 40 ml scintillation vial. The scintillation vial was then placed under a nitrogen purge to evaporate the solvent to dryness. A 0.3 ml aliquot of acetonitrile was added to the wash residue and shaken for 15 min to redissolve the residue. The solution was then transferred to a low volume reservoir vial and evaporated to dryness under the nitrogen purge. A 50 ul solution of 2 ppm D-10 anthracene was then added to the low-volume reservoir vial and analyzed by GC-MS. N.D. is for "not detected." To measure the results, the procedures "Analytical Testing Procedure" and "GC MS Analysis" described above were practiced.

The results of Example 2 are summarized in Table 4.

TABLE 4

| Elution Time | Identification | Peak Area | ng/g |
|---|---|---|---|
| 13.99 | internal standard | 11892575 | |
| 16.17 | Hexadecanamide | | N.D. |
| 17.24 | 9-octadecenamide | 1260016 | 5.2 |
| 17.36 | Octadecanamide | | N.D. |
| 18.1 | di-octyl phthalate | 197172 | 0.8 |
| 19.44 | 13-docosenamide | 509232 | 2.1 |
| 28.2 | Hindered Phosphite | 3969834 | 16.4 |
| 33.5 | C20-C40 Organic Molecule | 2750055 | 11.3 |

The results of Example 2 show that articles made from PEI 1 were found to be contaminated per the test protocol above and is not expected to perform during processing and final part performance. Our results show that the respective composition (which was not aniline-endcapped) was not clean room ready. More particularly, our results showed that articles molded from the resin material used above released detectable combined amount of 35.8 ppb, substantially above the amount of residuals obtained with our invention.

Example 3 (Comparative)

A GC-MS analysis with acetonitrile (ACN) rinse of PEI 2 (ULTEM® PEI 1010K) was practiced. A 5 gram sample of PEI 2 (ULTEM® PEI 1010K Resin) was poured directly into a 40 ml scintillation vial. A 10 ml aliquot of acetonitrile (HRGC grade) was added to the vial by pipette. The vial was then capped and placed on a mechanical shaker for 5 min. The wash solution was then separated from the pellets by pouring into a new, 40 ml scintillation vial. The scintillation vial was then placed under a nitrogen purge to evaporate the solvent to dryness. A 0.3 ml aliquot of acetonitrile was added to the wash residue and shaken for 15 min to redissolve the residue. The solution was then transferred to a low volume reservoir vial and evaporated to dryness under the nitrogen purge. A 50 ul solution of 2 ppm D-10 anthracene was then added to the low-volume reservoir vial and analyzed by GC-MS. N.D. is for "not detected." To measure the results, the procedures "Analytical Testing Procedure" and "GC MS Analysis" described above were practiced.

The results of Example 3 are summarized in Table 5. PEI 2 was found to be contaminated per the test protocol above and is not expected to perform during processing and final part performance.

TABLE 5

| Elution Time | Identification | Peak Area | ng/g |
|---|---|---|---|
| 13.99 | internal standard | 9477817 | |
| 16.17 | Hexadecanamide | | N.D. |
| 17.24 | 9-octadecenamide | 1942940 | 10.2 |
| 17.36 | Octadecanamide | 287835 | 1.5 |
| 18.1 | di-octyl phthalate | 239276 | 1.3 |
| 19.44 | 13-docosenamide | 829302 | 4.4 |
| 28.23 | Hindered Phosphite | 4211276 | 22.1 |
| 33.5 | C20-C40 Organic Molecule | | N.D. |

The results of Example 3 show that articles made from PEI 2 were not clean room ready. More particularly, our results show that articles molded from the resin material used above released detectable combined amount of 39.5 ppb, substantially above the amount of residuals obtained with our invention.

Example 4 (Comparative)

A GC-MS analysis with acetonitrile (ACN) rinse of PEI 3 was practiced. A 5 gram sample of PEI 3 (the experimental polyetherimide sample described above) was poured directly into a 40 ml scintillation vial. A 10 ml aliquot of acetonitrile (HRGC grade) was added to the vial by pipette. The vial was then capped and placed on a mechanical shaker for 5 min. The wash solution was then separated from the pellets by pouring into a new, 40 ml scintillation vial. The scintillation vial was then placed under a nitrogen purge to evaporate the solvent to dryness. A 0.3 ml aliquot of acetonitrile was added to the wash residue and shaken for 15 min to redissolve the residue. The solution was then transferred to a low volume reservoir vial and evaporated to dryness under the nitrogen purge. A 50 ul solution of 2 ppm D-10 anthracene was then added to the low-volume reservoir vial and analyzed by GC-MS. N.D. is for "not detected." To measure the results, the procedures "Analytical Testing Procedure" and "GC MS Analysis" described above were practiced.

The results of Example 4 are summarized in Table 6. Resin EXUM0236 was found to be contaminated per the test protocol above and is not expected to perform during processing and final part performance.

TABLE 6

| Elution Time | Identification | Peak Area | ng/g |
|---|---|---|---|
| 13.99 | internal standard | 11798309 | |
| 16.17 | Hexadecanamide | | N.D. |
| 17.24 | 9-octadecenamide | 1234298 | 5.1 |
| 17.36 | Octadecanamide | 213926 | 0.9 |
| 18.1 | di-octyl phthalate | 267399 | 1.1 |
| 19.44 | 13-docosenamide | 580567 | 2.4 |
| 28.23 | Hindered Phosphite | | N.D. |
| 33.49 | C20-C40 Organic Molecule | 2151969 | 8.9 |

Our results show that when a composition comprising a polyimide component selected from the group consisting of polyetherimides, polyetherimide sulfones, and combinations thereof; wherein the polyimide component is phosphorous-free, not aniline-endcapped and the composition is not clean room ready. More particularly, our results show that articles molded from the resin material used above released detectable combined amount of 18.4 ppb, substantially above the amount of residuals obtained with our invention.

Example 5 (Inventive)

The purpose of this example was to determine the releasable residuals of articles made from our aniline end-capped polyetherimide resin at higher temperatures than those conducted at room temperature (the temperature at which gas chromatography mass spectroscopy analysis was practiced at 350 for 15 minutes (also referred to as Thermal Desorption).

A Thermal Desorption GC-MS analysis of PEI 4 was practiced. A ~100 mg sample of each set of PEI 4 was analyzed separately by thermal desorption GC-MS. The samples were heated to either 350° C. for 15 min and desorbed compounds were cryogenically trapped (−120° C.). The trap was then rapidly heated to 350° C. and evolved compounds were analyzed by GC-MS.

The results of Example 5 are summarized in Table 7. Resin PEI 4 was found to be the cleanest per the test protocol above and is expected to perform better during processing and final part performance.

TABLE 7

| Elution Time | Identification | Peak Area | ng/g (ppb) |
|---|---|---|---|
| 10.49 | Methylbenzofuran | 1.08E+08 | 841 |
| 13.56 | tert-butylphenol | | N.D. |
| 14.1 | phthalic anhydride | | N.D. |
| 14.92 | unknown, MW = 204 | | N.D. |
| 15.04 | unknown, MW = 188 | | N.D. |
| 15.24 | 2,3-dihydro-3,3,5,6-tetramethyl 1H-Inden-1-one, MW = 188 | | N.D. |
| 16.05 | di-tert-butylphenol | | N.D. |
| 16.39 | unknown, MW = 206 | 1.10E+08 | 860 |
| 16.32 | di-tert-butylphenol isomer | | N.D. |
| 18.75 | MW = 210 | 1.78E+09 | 13896 |
| 22.34 | 2-phenyl-1H-Isoindole-1,3(2H)dione, MW = 223 | 31206119 | 243 |
| 25.91 | MW = 238, mono-amine | | N.D. |
| 26.48 | unknown, MW = 293 | 22551323 | 176 |
| 28.85 | unknown, MW = 315 | 36088586 | 281 |
| 30.29 | unknown, MW = 380 | 18626867 | 145 |
| 30.95 | unknown, MW = 355 | 1.04E+08 | 811 |
| 31.22 | Hindered Phosphite | | N.D. |

The results of Example 5 show that articles made from our composition were clean room ready. The results also show that articles molded from the resin material used above released detectable combined amount of 17253 ppb substantially below the amount of residuals obtained with Comparative Example 6.

Example 6 (Comparative)

A Thermal Desorption GC-MS analysis of PEI 1 was practiced. A ~100 mg sample of each set of ULTEM® PEI 1010 was analyzed separately by thermal desorption GC-MS. The samples were heated to either 350° C. for 15 min and desorbed compounds were cryogenically trapped (−120° C.). The trap was then rapidly heated to 350° C. and evolved compounds were analyzed by GC-MS.

The results of Example 6 are summarized in Table 8. Resin PEI 1 was found to be contaminated per the test protocol above and is not expected to perform during processing and final part performance.

TABLE 8

| Elution Time | Identification | Peak Area | ng/g |
|---|---|---|---|
| 10.49 | methylbenzofuran | | N.D. |
| 13.56 | tert-butylphenol | 1.25E+08 | 970 |
| 14.1 | phthalic anhydride | 2.20E+08 | 1716 |
| 14.92 | unknown, MW = 204 | 16091438 | 125 |
| 15.04 | unknown, MW = 188 | 27346159 | 213 |
| 15.24 | 2,3-dihydro-3,3,5,6-tetramethyl 1H-Inden-1-one, MW = 188 | 41131277 | 321 |
| 16.05 | di-tert-butylphenol | 1.65E+09 | 12878 |
| 16.39 | unknown, MW = 206 | | N.D. |
| 16.32 | di-tert-butylphenol isomer | 1.34E+09 | 10472 |
| 18.71 | MW = 210 | 2.75E+08 | 2142 |
| 22.34 | 2-phenyl-1H-Isoindole-1,3(2H)dione, MW = 223 | | N.D. |
| 25.91 | MW = 238, mono-amine | 67511207 | 526 |
| 26.37 | unknown, MW = 293 | 43221302 | 337 |
| 28.85 | unknown, MW = 315 | | N.D. |
| 30.29 | unknown, MW = 380 | | N.D. |
| 30.95 | unknown, MW = 355 | | N.D. |
| 31.22 | Hindered Phosphite | 5.25E+09 | 40900 |
| 32.2 | Hindered Phosphite | 1.58E+09 | 12306 |

The results of Example 6 show that when a composition comprising a polyimide component selected from the group consisting of polyetherimides, polyetherimide sulfones, and combinations thereof; wherein the polyimide component is not phosphorous-free, not aniline-endcapped and the composition is not clean room ready. The results also show that articles molded from the resin material used above released detectable combined amount of 82906 ppb substantially above the amount of residuals obtained with our invention.

Although the present invention has been described in considerable detail with reference to certain preferred versions thereof, other versions are possible. Therefore, the spirit and scope of the appended claims should not be limited to the description of the preferred versions contained herein.

The reader's attention is directed to all papers and documents which are filed concurrently with this specification and which are open to public inspection with this specification, and the contents of all such papers and documents are incorporated herein by reference.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C §112, sixth paragraph.

What is claimed is:

1. A composition comprising a monoamine-endcapped polyimide component selected from the group consisting of monoamine-endcapped polyetherimides,
    wherein the composition, based on a gas chromatography mass spectroscopy analysis of a surface rinse of the composition performed at room temperature, has at least one surface with
        less than or equal to 5 ppb releasable phosphorous residuals,
        less than or equal to 5 ppb releasable volatile organic compound residuals, and
    wherein the composition comprises less than or equal to 10 ppb combined releasable residuals.

2. The composition of claim 1, wherein the composition contains <3 ppb phosphorous.

3. The composition of claim 1, wherein the composition contains <1 ppb phosphorous.

4. The composition of claim 1, wherein the monoamine-endcapped polyimide component is aniline-endcapped.

5. The composition of claim 1, wherein the composition further comprises a filler selected from the group of organic fillers, inorganic fillers, and combinations thereof.

6. The composition of matter of claim 1, wherein the composition further comprises a filler selected from the group of carbon fibers, glass fibers, minerals, and combinations thereof.

7. The composition of claim 1, wherein the composition contains <2 weight percent stabilizers.

8. The composition of claim 1, wherein the composition contains <1 weight percent stabilizers.

9. The composition of claim 1, wherein the composition contains <0.001 weight percent stabilizers.

10. The composition of claim 1, wherein the composition does not contain stabilizers.

11. The composition of claim 1, wherein the composition, based on a gas chromatography mass spectroscopy analysis of vapors released at 350 degrees Celsius, for 15 minutes, has at least one surface having less than or equal to 20,000 ppb combined releasable inorganic volatile compounds and organic volatile compounds.

12. A composition comprising:
    (a) from 60 to 99 weight percent of a polyimide component selected from the group consisting of polyetherimides, polyetherimide sulfones, and combinations thereof, wherein the composition contains <5 ppb releasable phosphorous residuals, wherein the polyimide component is monoamine-endcapped; and
    (b) from 1 to 40 weight percent of a filler.

13. The composition of claim 12, wherein the polyimide component is aniline-endcapped.

14. The composition of claim 12, wherein the filler is selected from the group of organic fillers, inorganic fillers, and combinations thereof.

15. The composition of claim 12, wherein the filler is selected from the group of carbon fibers, fiber glass, minerals, and combinations thereof.

* * * * *